US 8,599,148 B2

(12) United States Patent
Chung et al.

(10) Patent No.: US 8,599,148 B2
(45) Date of Patent: Dec. 3, 2013

(54) MOBILE TERMINAL AND SCREEN CONTROL METHOD THEREOF

(75) Inventors: Jin-Woo Chung, Seoul (KR); Moon-Ju Kim, Gyeonggi-Do (KR); Hye-Jin Ryu, Seoul (KR); Dong-Seok Lee, Seoul (KR)

(73) Assignee: LG Electronics Inc., Seoul (KR)

( * ) Notice: Subject to any disclaimer, the term of this patent is extended or adjusted under 35 U.S.C. 154(b) by 937 days.

(21) Appl. No.: 12/414,916

(22) Filed: Mar. 31, 2009

(65) Prior Publication Data

US 2009/0256814 A1    Oct. 15, 2009

(30) Foreign Application Priority Data

Apr. 10, 2008 (KR) .................. 10-2008-0033353

(51) Int. Cl.
*G06F 3/041* (2006.01)
*G09G 3/36* (2006.01)
*G06K 11/06* (2006.01)
*G08C 21/00* (2006.01)

(52) U.S. Cl.
USPC ...... 345/173; 345/102; 178/18.01; 178/20.01

(58) Field of Classification Search
USPC ............ 345/102, 173–178; 178/18.01–20.04; 463/31
See application file for complete search history.

(56) References Cited

U.S. PATENT DOCUMENTS

| 5,969,706 A * | 10/1999 | Tanimoto et al. ............. 345/671 |
| 6,774,900 B1 * | 8/2004 | Kubota et al. ................. 345/473 |
| 7,657,849 B2 * | 2/2010 | Chaudhri et al. ............. 715/863 |
| 2006/0227122 A1 * | 10/2006 | Proctor ........................ 345/204 |
| 2007/0146344 A1 * | 6/2007 | Martin et al. ................. 345/173 |
| 2008/0077882 A1 * | 3/2008 | Kramer et al. ............... 715/810 |
| 2008/0238880 A1 * | 10/2008 | Miwa ............................. 345/173 |
| 2009/0051660 A1 * | 2/2009 | Feland et al. ................. 345/173 |

* cited by examiner

*Primary Examiner* — Ilana Spar

(74) *Attorney, Agent, or Firm* — Lee, Hong, Degerman, Kang & Waimey

(57) ABSTRACT

A mobile terminal is provided. The mobile terminal includes a display for sensing at least one of a touch or an approach of a pointing means and a controller for controlling brightness of a sensed area according to the sensed touch or the approach of the pointing means.

19 Claims, 14 Drawing Sheets

MOBILE TERMINAL AND SCREEN CONTROL METHOD THEREOF

CROSS-REFERENCE TO RELATED APPLICATIONS

Pursuant to 35 U.S.C. 119(a), this application claims the benefit of earlier filing date and right of priority to Korean Application No. 10-2008-0033353, filed on Apr. 10, 2008, which is hereby incorporated by reference herein in its entirety.

BACKGROUND OF THE INVENTION

1. Field of the Invention

The present invention relates to a mobile terminal, specifically to a mobile terminal which may adjust the brightness of an area where a direct touch or a proximity touch of an object is sensed, and a screen control method thereof.

2. Discussion of the Related Art

A mobile terminal is a device which may be configured to perform various functions, such as data and voice communications, capturing images and video via a camera, recording audio, outputting music files via a speaker system, and displaying images and video on a display. Some terminals include additional functionality which supports game playing, while other terminals are configured as multimedia players. More recently, mobile terminals have been configured to receive broadcast and multicast signals for displaying content such as video and television programs.

Efforts are ongoing to support and increase the functionality of mobile terminals. Such efforts include software and hardware improvements, as well as changes and improvements in the structural components which form the mobile terminal.

The mobile terminal may be configured to illuminate an entire display area while performing a function. Additionally, the mobile terminal may terminate the supply of power to a display backlight if there is no activity on the mobile terminal for a predetermined period of time.

For example, the entire display area may be illuminated if a user operates a mobile terminal to check information such as a text message received while the user is watching a movie in a theatre. Accordingly, the illuminated display area may disturb other patrons of the theatre. Furthermore, the illuminated display may display private information if a user checks personal information in a public space, such as a subway station, a store, or a public office.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

In accordance with an embodiment a mobile terminal is presented. The mobile terminal includes a display for sensing at least one of a touch or an approach of a pointing means, and a controller for controlling brightness of a sensed area according to the sensed touch or the approach of the pointing means.

According to one feature, the display includes a touch sensor for sensing a touch via the pointing means and a proximity sensor for sensing the approach of the pointing means. Additionally, the controller controls a power supply to a backlight of the display corresponding to the sensed area, wherein the backlight adjust the brightness of the sensed area.

Furthermore, the controller replaces a first color of information not displayed in the sensed area with a darker color.

According to another feature, the controller expands the sensed area in proportion to a time for which a predetermined distance between the pointing means and the display is maintained. Additionally, the controller executes a function associated with the sensed area if a predetermined distance between the display and the pointing means is maintained for a predetermined time.

According to yet another feature, the controller controls the brightness of the sensed area according to the time which the touch via the pointing means is maintained. Additionally, the controller executes a function associated with the sensed area if a second touch is detected after the touch or approach of the pointing means is sensed.

In accordance with another embodiment, a screen control method of a mobile terminal is presented. The screen control method includes sensing an approach of a pointing means on an area of a display screen, calculating a distance between the pointing means and the sensed area, and controlling brightness of the sensed area according to the calculated distance.

In accordance with yet another embodiment, a screen control method of a mobile terminal is presented. The screen control method includes sensing a touch via a pointing means on an area of a display screen, determining a time for which the touch is maintained on the sensed area, and controlling brightness of the sensed area according to the determined touch time.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Figure 1:
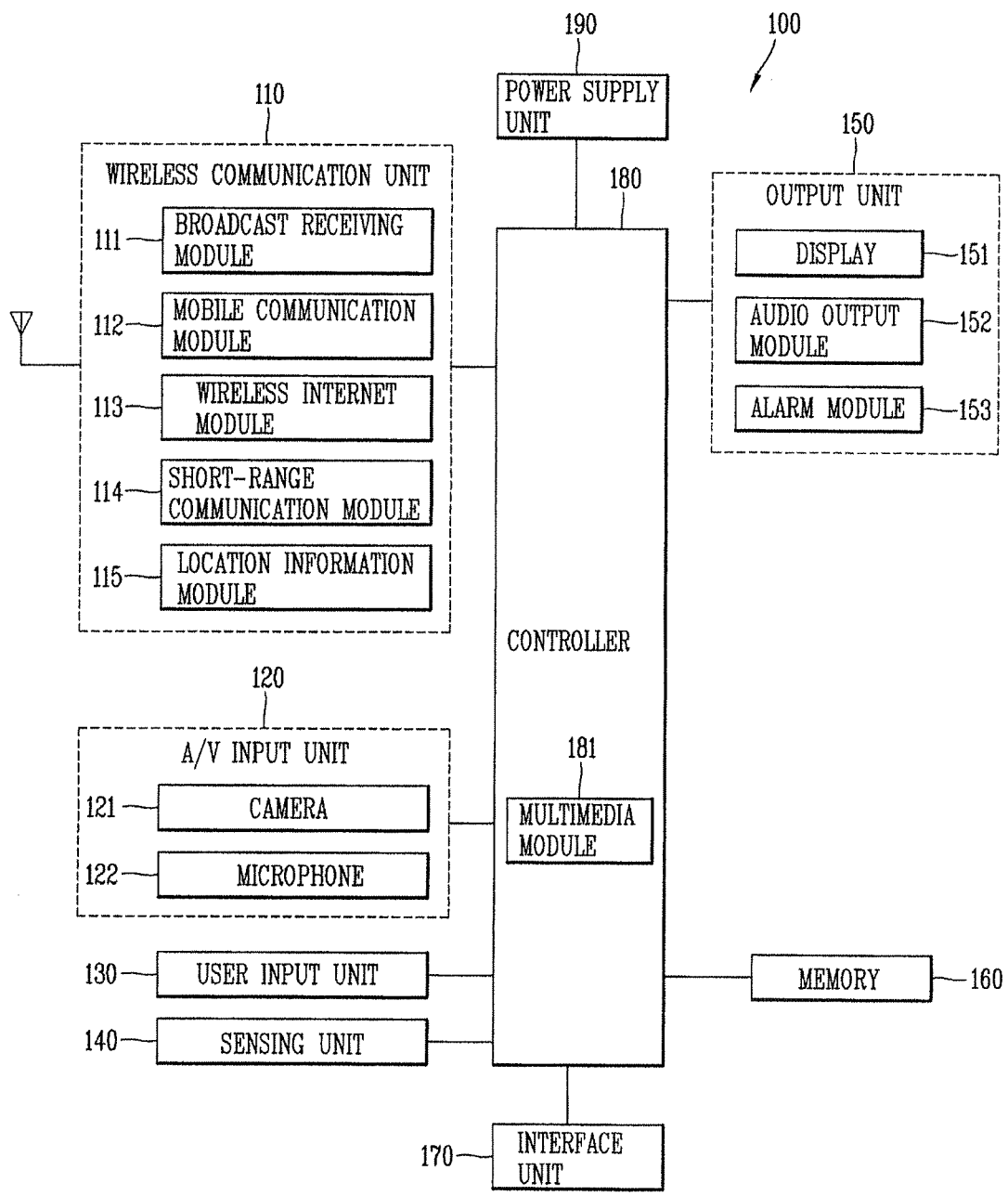
FIG. 1 illustrates a schematic block diagram of a mobile terminal according to one embodiment of the present invention.

FIG. 1 is a block diagram of a mobile terminal 100 in accordance with an embodiment of the present invention. The mobile terminal 100 may be implemented as a variety of terminal types. Examples of such terminals include mobile phones, user equipment, smart phones, computers, digital broadcast terminals, personal digital assistants (PDAs), portable multimedia players (PMP), and navigators.

By way of non-limiting example only and for convenience and conciseness of the following description, the present invention is illustrated as a mobile phone. It is not intended to limit the scope of the present invention. The teachings of the present invention apply equally to other types of terminals.

FIG. 1 shows the terminal 100 having various components, but it is understood that implementing all of the illustrated components is not a requirement. Greater or fewer components may alternatively be implemented.

FIG. 1 shows a mobile terminal 100 configured with various components. For example, the mobile terminal 100 may be configured with a wireless communication unit 110, an Audio/Video (A/V) input unit 120, a user input unit 130, a sensing unit 140, an output unit 150, a memory 160, an interface 170, a controller 180, and a power supply 190.

FIG. 1 shows a wireless communication unit 110 configured with various components. For example, the wireless communication unit 110 typically includes one or more components which permit wireless communication between the mobile terminal 100 and a wireless communication system or network within which the mobile terminal is located. In case of non-mobile terminals, the wireless communication unit 110 may be replaced with a wired communication unit. The wireless communication unit 110 and wired communication unit may be commonly referred to as a communication unit.

A broadcast receiving module 111 receives a broadcast signal and broadcast associated information from an external broadcast managing entity via a broadcast channel. The broadcast channel may include a satellite channel or a terrestrial channel. The broadcast managing entity may be a system which transmits a broadcast signal or broadcast associated information.

Examples of broadcast associated information include information associated with a broadcast channel, a broadcast program, or a broadcast service provider. For example, broadcast associated information may include an electronic program guide (EPG) of digital multimedia broadcasting (DMB) or electronic service guide (ESG) of digital video broadcast-handheld (DVB-H).

The broadcast signal may be implemented as a TV broadcast signal, a radio broadcast signal, or a data broadcast signal. The broadcast signal may further include a broadcast signal combined with a TV or radio broadcast signal.

The broadcast receiving module 111 may receive broadcast signals transmitted from various types of broadcast systems. By nonlimiting example, such broadcasting systems include digital multimedia broadcasting-terrestrial (DMB-T), digital multimedia broadcasting-satellite (DMB-S), digital video broadcast-handheld (DVB-H), the data broadcasting system known as media forward link only (MediaFLO®), and integrated services digital broadcast-terrestrial (ISDB-T).

The broadcast receiving module may also receive multicast signals. Data received by the broadcast receiving module 111 may be stored in a suitable device, such as a memory 160. The broadcast associated information may be provided via a mobile communication network, and received by the mobile communication module 112.

The mobile communication module 112 transmits and receives wireless signals to and from one or more network entities, such as a base station or a Node-B. The wireless signals may represent audio, video, multimedia, control signaling, or data.

The wireless Internet module 113 provides Internet access for the terminal. The wireless Internet module 113 may be internally or externally coupled to the terminal 100. Suitable technologies for wireless Internet may include, but are not limited to, WLAN (Wireless LAN)(Wi-Fi), Wibro (Wireless broadband), Wimax (World Interoperability for Microwave Access), and HSDPA (High Speed Downlink Packet Access). The wireless Internet module can be replaced with a wired Internet module in non-mobile terminals. The wireless Internet module 113 and wired Internet module may be commonly referred to as an Internet module.

The short-range communication module 114 facilitates short-range communications. Suitable technologies for implementing this module include radio frequency identification (RFID), infrared data association (IrDA), ultra-wideband (UWB), as well as the networking technologies commonly referred to as Bluetooth™ and ZigBee™.

The location information module 115 identifies and obtains the location of the mobile terminal 100. The location information module 115 may be implemented using global positioning system (GPS) components which cooperate with associated satellites and network components.

The audio/video (A/V) input unit 120 provides audio or video signal input to the terminal 100. The A/V input unit 120 may include a camera 121 and a microphone 122. The camera 121 receives and processes image frames of still pictures or video. Two or more cameras 121 may be provided according to the configuration of the mobile terminal.

The microphone 122 receives an external audio signal while the portable device is in a particular mode, such as a phone call mode, a recording mode, or a voice recognition mode. The audio signal is processed and converted into digital data. The terminal 100 and A/V input unit 120 may include assorted noise removing algorithms to remove noise generated in the course of receiving the external audio signal.

Data generated by the A/V input unit 120 may be stored in the memory 160, utilized by the output unit 150, or transmitted via one or more modules of communication unit 110. The terminal 100 may include two or more microphones and cameras.

The user input unit 130 generates input data in response to user manipulation of an associated input device or devices. Examples of such devices include a keypad, a dome switch, a touchpad, a jog wheel, and a jog switch.

The sensing unit 140 provides status measurements for various aspects of the terminal 100. For example, the sensing unit may detect an open and closed state of the terminal 100, relative positioning of components of the terminal, a change of position of the terminal, a change of position of a component of the terminal, a presence or absence of user contact with the terminal, orientation of the terminal, or acceleration or deceleration of the terminal. The sensing unit 140 may also sense the presence or absence of power provided by the power supply 190 and the presence or absence of a connection between the interface unit 170 and an external device.

The interface unit 170 may be implemented to connect the terminal with an external device. External devices include wired or wireless headphones, external chargers, power supplies, storage devices configured to store data, or microphones. The interface unit 170 may be configured using a wired and wireless data port, audio input/output (I/O) ports, or video (I/O) ports. The interface unit 170 may also include a card socket for connecting various cards, such as a memory card, a subscriber identity module (SIM) card, a user identity module (UIM) card, or a replaceable user identity module (RUIM) card.

The output unit 150 outputs information associated with the terminal 100. The display 151 is typically implemented to display information associated with the terminal 100. For example, the display 151 may provide a graphical user interface which includes information associated with a phone call if the terminal is operating in a phone call mode. The display 151 may display images which are associated with various modes, such as a video call mode or a photographing mode.

The display 151 may be configured as a touch screen working in cooperation with the input unit 130, in one embodiment of the present invention. This configuration allows the display 151 to function both as an output device and an input device.

In addition, the display 151 may include a proximity sensor for sensing an approach of the pointing means and a touch sensor for sensing a touch by the pointing means. Specifically, the display 151 may be implemented with the sensing unit 140 capable of sensing the approach and touch by the pointing means.

The proximity sensor may detect and output a distance between the pointing means and the sensor according to the capacitance which varies in response to a proximity distance of the pointing means. The proximity sensor may also output a proximate location information of the pointing means. The proximity sensor has described as a capacitance type proximity sensor, however, various types of proximity sensors may also be used.

The touch sensor outputs location information of a certain area where a touch by the pointing means is sensed. The touch sensor may be implemented as a touch panel in the form of a static pressure unit or capacitance unit. A touch screen may be configured when the touch panel is overlaid on the display 151 in a layered manner. Therefore, the display 151 may function as both a display device and an input device.

The display 151 may be implemented using known display technologies such as a liquid crystal display (LCD), a thin film transistor-liquid crystal display (TFT-LCD), an organic light-emitting diode display (OLED), a flexible display, or a three-dimensional display. The terminal 100 may include one or more of such displays. An example of a two-display embodiment is one in which one display 151 is configured as an internal display which is viewable when the terminal is in an opened position and a second display 151 configured as an external display which is viewable in both the open and closed positions.

FIG. 1 further shows the output unit 150 having an audio output module 152. The audio output module 152 may be implemented using one or more speakers, buzzers, or other audio producing devices.

The audio output module 152 functions in various modes including a call-receiving mode, a call-placing mode, a recording mode, a voice recognition mode, or a broadcast reception mode. The audio output module 152 outputs audio related to a particular function, such as a call notification, a message notification, or an error notification.

The output unit 150 is further illustrated having an alarm module 153, which may be used to identify the occurrence of an event associated with the mobile terminal 100. An example of such output includes providing a vibration as a notification to a user.

The alarm module 153 may vibrate when the terminal 100 receives a call or message. Vibration may also be provided by the alarm module 153 in response to receiving user input at the terminal 100, thereby providing a tactile feedback mechanism. It is understood that the various outputs provided by the components of output unit 150 may be performed separately or performed using any combination of the components.

A memory 160 may store various types of data to support the processing, control, and storage requirements of the mobile terminal 100. Examples of such data include program instructions for applications operating on the mobile terminal 100, contact data, phonebook data, messages, pictures, and video. Additionally, the memory 160 may store a table for different levels of brightness according to a distance between the pointing means, or touch time.

Additionally, data for various patterns of vibration and sound output in response to a touch input on the touchscreen may be stored in the memory 160. Details of the various patterns of vibration and sound will be explained below.

The memory 160 may be implemented using any type of volatile and non-volatile memory or storage devices. Such devices may include random access memory (RAM), static random access memory (SRAM), electrically erasable programmable read-only memory (EEPROM), erasable programmable read-only memory (EPROM), programmable read-only memory (PROM), read-only memory (ROM), magnetic memory, flash memory, magnetic or optical disk, card-type memory, or other similar memory or data storage device.

The controller 180 controls the overall operations of the terminal. For example, the controller 180 performs the control and processing associated with voice calls, data communications, video calls, camera operations, and recording operations.

The controller may include a multimedia module 181 which provides multimedia playback. The multimedia module 181 may be configured as part of the controller 180 or may be implemented as a separate component.

The power supply 190 provides power to the various components of the terminal 100. The power provided may be internal power or external power.

Various embodiments described herein may be implemented in a computer-readable medium using computer software. The various embodiments may also be implemented in hardware.

A hardware implementation may be implemented using one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, or other electronic units designed to perform the functions described herein. Some embodiments are implemented by a controller 180

A software implementation of the embodiments described herein may be implemented with separate software modules, such as procedures and functions, each of which perform one or more of the functions and operations described herein. The software code may be implemented with a software application written in any suitable programming language and may be stored in the memory 160 for execution by the controller 180 or a processor.

The mobile terminal 100 may be implemented in a variety of different configurations. Examples of such configurations include folder-type, slide-type, bar-type, rotational-type, and swing-type.

For clarity, further disclosure will primarily relate to a slide-type mobile terminal 100. However such teachings apply equally to other types of mobile terminals 100.

Figure 2:
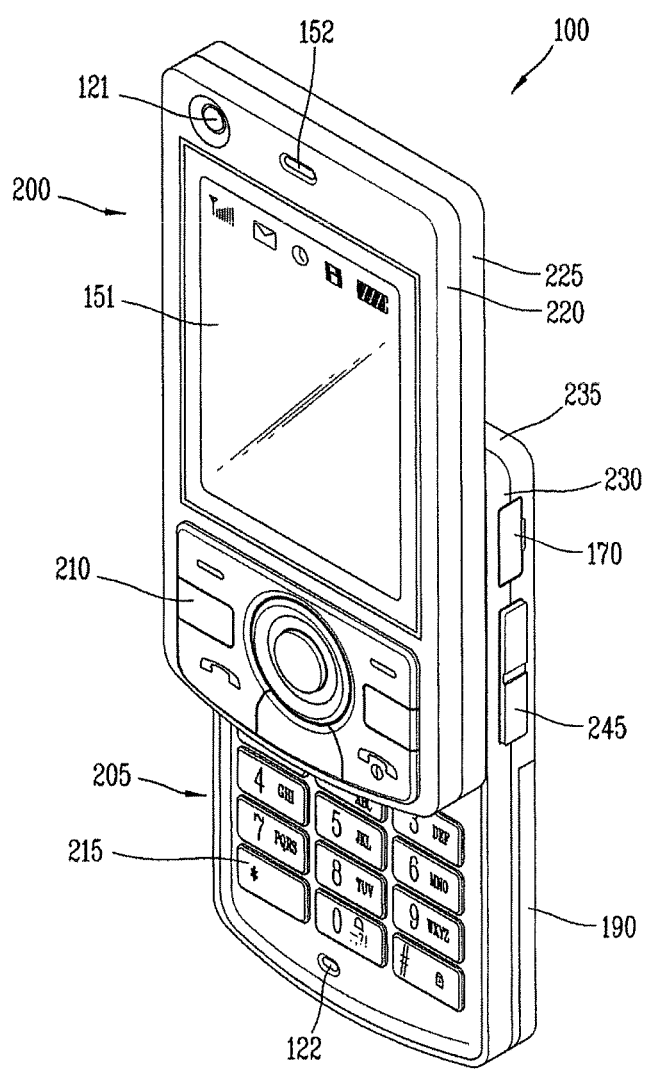
FIG. 2 illustrates a front perspective view of a mobile terminal according to one embodiment of the present invention.

FIG. 2 is a perspective view of a front side of a mobile terminal 100 according to an embodiment of the present invention. As illustrated in FIG. 2, the mobile terminal 100 is shown having a first body 200 configured to slidably cooperate with a second body 205.

The first body 200 slides relative to the second body 205 between open and closed positions. Although not shown in drawings, in a folder-type mobile terminal, a first body thereof folds and unfolds relative to a second body thereof between open and closed positions. In addition, in a swing-type mobile terminal, a first body thereof swings relative to a second body thereof between open and closed positions.

The first body 200 is positioned over the second body 205 in the closed position such that the keypad 215 is substantially or completely obscured by the first body. The user may access the keypad 215, the display 151, and function keys 210 in the open position. The function keys 210 may be configured for a user to enter commands such as 'start', 'stop', or 'scroll'.

The mobile terminal 100 is operable in either a standby mode or an active call mode. Typically, the terminal 100 functions in the standby mode when in the closed position and in the active mode when in the open position. The mode configuration may be changed as required or desired by the user.

The first body 200 is formed from a first case 220 and a second case 225 and the second body 205 is formed from a first case 230 and a second case 235. The respective first and second cases may be formed from a suitably rigid material, such as injection molded plastic, or formed using metallic material, such as stainless steel (STS) and titanium (Ti).

One or more intermediate cases may be provided between the first case 220 and second case 225 of the first body 200 or between the first case 230 and second case 235 of the second body 205. The first body 200 and the second body 205 may be sized to house electronic components necessary to support operation of the mobile terminal 100.

The first body 200 is illustrated having a camera 121 and audio output module 152. The camera 121 may be selectively positioned such that the camera may rotate or swivel relative to the first body 200.

The function keys 210 are positioned adjacent to a lower side of the display 151. The display 151 is implemented as an LCD. The display 151 may also be configured as a touchscreen having an underlying touchpad which generates signals responsive to user contact with the touchscreen.

The second body 205 is illustrated having a microphone 122 positioned adjacent to the keypad 215 and side keys 245 positioned along the side. The side keys 245 may be configured as hot keys, such that the side keys are associated with a particular function of the terminal 100.

An interface unit 170 is positioned adjacent to the side keys 245. A power supply 190 in a form of a battery is located on a lower portion of the second body 205. The interface 170 may be used as a link for which the mobile terminal may exchange data with an external device. For example, the interface 170 may be implemented as at least one of a connection port for connecting an earphone to the mobile terminal via a wired or wireless means, a port for short-range communications, such as an Infrared Data Association (IrDA) port, a Bluetooth™ port, or a wireless LAN port, or a power supply port for providing power to the mobile terminal.

Figure 3:
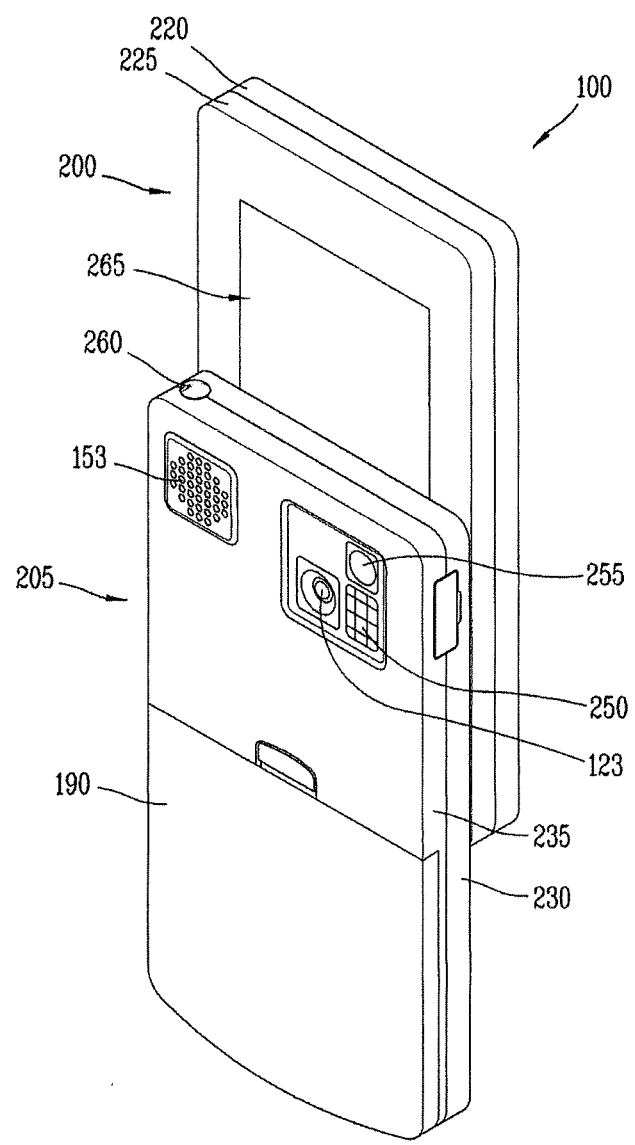
FIG. 3 illustrates a rear perspective view of a mobile terminal according to one embodiment of the present invention.

FIG. 3 is a rear view of the mobile terminal 100 shown in FIG. 2. As illustrated in FIG. 3, the second body 205 includes a camera 123, a flash 250, and a mirror 255.

The flash 250 operates in conjunction with the camera 123. The mirror 255 is useful for assisting a user to position the camera 123 in a self-portrait mode.

The camera 123 of the second body 205 faces a direction opposite to a direction faced by camera 121 of the first body 200. The camera 121 of the first body 200 and camera 123 of the second body 205 may have the same or different capabilities.

In one embodiment, the camera 121 of the first body 200 operates with a relatively lower resolution than the camera 123 of the second body 205. Such an arrangement works well during a video conference in which reverse link bandwidth capabilities may be limited. The relatively higher resolution of the camera 123 of the second body 205 is useful for obtaining higher quality pictures.

The second body 205 also includes an audio output module 153 configured as a speaker which is located on an upper side of the second body. The audio output module 152 of the first body 200 and the audio output module 153 of second body 205 may cooperate to provide stereo output. Moreover, either or both of the audio output modules 152 and 153 may be configured to operate as a speakerphone.

A broadcast signal receiving antenna 260 is illustrated located at an upper end of the second body 205. The antenna 260 functions in cooperation with the broadcast receiving module 111. The antenna 260 may be fixed or configured to retract into the second body 205.

The rear side of the first body 200 includes a slide module 265. The slide module 265 slideably couples with a corresponding slide module (not illustrated) located on the front side of the second body 205.

It is understood that the illustrated arrangement of the various components of the first body 200 and the second body 205 may be modified as desired. Some or all of the components of one body may alternatively be implemented on the other body. In addition, the location and relative positioning of the components are not critical to many embodiments and, therefore, the components may be positioned at locations which differ from those illustrated by the representative figures.

The mobile terminal 100 may operate in a communication system capable of transmitting data via frames or packets. The communication system may include wired communication, wireless communication, or a satellite-based communication system.

The communication system may utilize various systems such as frequency division multiple access (FDMA), time division multiple access (TDMA), code division multiple access (CDMA), universal mobile telecommunications system (UMTS), long term evolution (LTE) of the UMTS, or the global system for mobile communications (GSM). By way of non-limiting example, further description will relate to a CDMA communication system, but such teachings apply equally to other system types.

Figure 4:
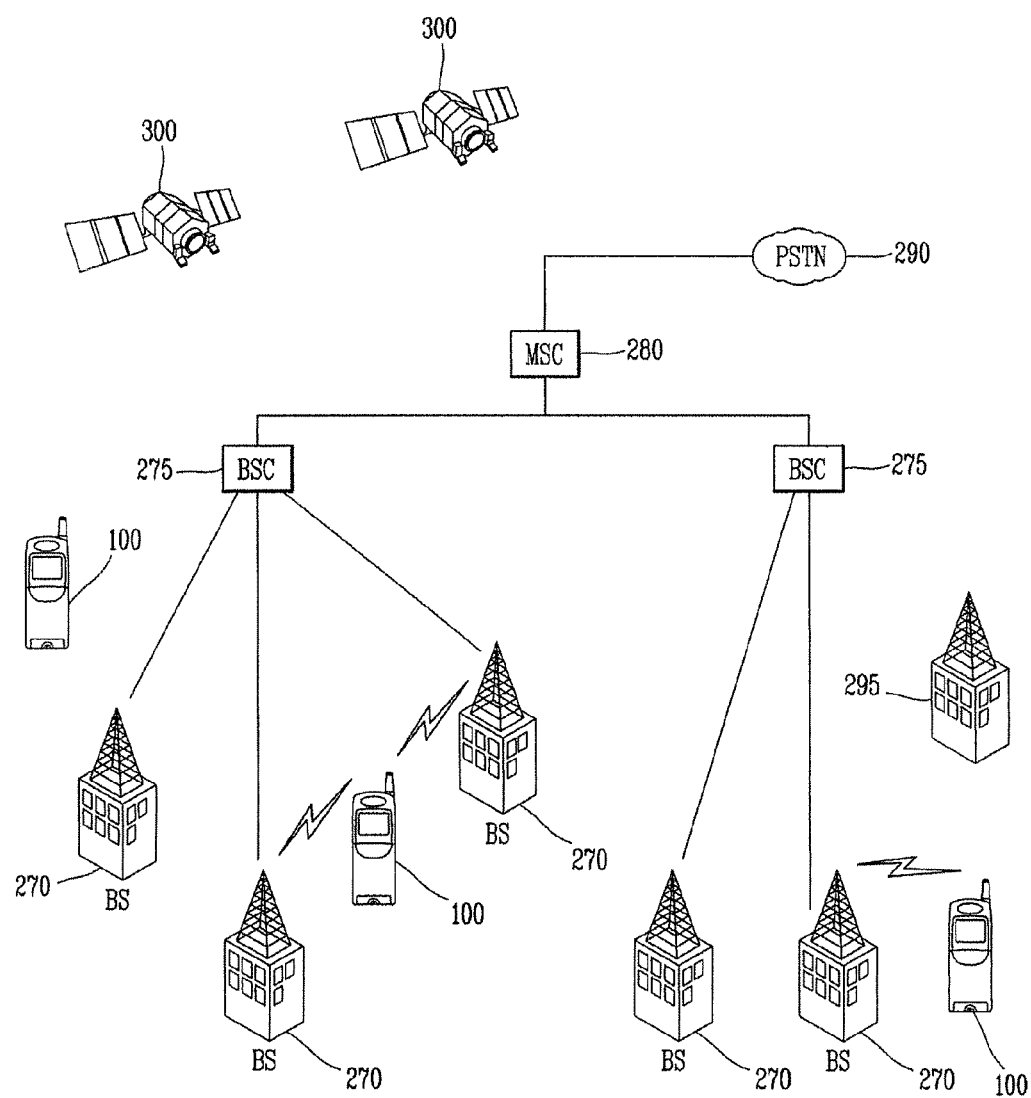
FIG. 4 illustrates an overview of a wireless communication system operable with the mobile terminal according to one embodiment of the present invention.

As illustrated in FIG. 4, a CDMA wireless communication system is illustrated having a plurality of terminals 100, a plurality of base stations (BS) 270, base station controllers (BSC) 275, and a mobile switching center (MSC) 280. The MSC 280 is configured to interface with a conventional public switch telephone network (PSTN) 290 and is also configured to interface with the BSCs 275.

The BSCs 275 are coupled to the BSs 270 via backhaul lines. The backhaul lines may be configured in accordance with any of several known interfaces including E1/T1, ATM, IP, PPP, Frame Relay, HDSL, ADSL, or XDSL. It is to be understood that the system may include more than two BSCs 275.

Each BS 270 may include one or more sectors, each sector having an omnidirectional antenna or an antenna pointed in a particular direction radially away from the BS 270. Each sector may include two antennas for diversity reception. Each BS 270 may be configured to support a plurality of frequency assignments, with each frequency assignment having a particular spectrum.

The intersection of a sector and frequency assignment may be referred to as a CDMA channel. The BSs 270 may also be referred to as base station transceiver subsystems (BTSs). In an alternate embodiment, the term "base station" may be used to refer collectively to a BSC 275 and one or more BSs 270.

The BSs 270 may also be denoted "cell sites." Alternatively, individual sectors of a given BS 270 may be referred to as cell sites.

A broadcasting transmitter (BT) 295 is illustrated broadcasting to mobile terminals 100 operating within the system. The broadcast receiving module ill of the mobile terminal 100 is configured to receive broadcast signals transmitted by the BT 295. Similar arrangements may be implemented for other types of broadcast and multicast signaling.

FIG. 4 also shows several global positioning system (GPS) satellites 300. The GPS satellites 300 facilitate locating the position of some or all of the terminals 100. The position-location module 115 of the mobile terminal 100 is typically configured to cooperate with the satellites 300 to obtain position information.

Other types of position detection technology may be used in addition to or instead of GPS location technology. Some or all of the GPS satellites 300 may alternatively or additionally be configured to provide satellite DMB transmissions.

The BSs 270 receive sets of reverse-link signals from various terminals 100 during operation of the wireless communication system. The terminals 100 are performing calls, messaging, or other communications.

Each reverse-link signal received by a BS 270 is processed within that BS. The resulting data is forwarded to an associated BSC 275. The BSC 275 provides call resource allocation and mobility management functionality including soft handoffs between base stations 270. The BSCs 275 also route the received data to the MSC 280, which provides additional routing services for interfacing with the PSTN 290. Similarly, the PSTN 290 interfaces with the MSC 280 and the MSC interfaces with the BSC 275, which in turn control the BSs 270 to transmit sets of forward-link signals to the terminals 100.

Hereinafter, descriptions of a schematic configuration of the mobile terminal according to the present invention will be given in detail with reference to FIGS. 1 through 3.

A proximity or direct touch may be performed via a pointing means, such as a user's finger, or a stylus. The controller 180 may adjust a brightness level in the area where a proximity touch or a direct touch is sensed on the display 151. A radius of the area where the brightness level is adjusted may be a preset value or a value set by a user's menu manipulation.

Additionally, the controller 180 may gradually adjust a brightness level of the area where a direct touch or proximity touch is sensed according to the proximity distance or the touch time detected by the sensor. The area where the direct touch or the proximity touch is sensed may be referred to as the sensed area. For example, if a proximity distance between the pointing means and the sensor is decreased, the sensed area may increase in brightness, and conversely, if the proximity distance is increased, the sensed area may decrease in brightness. Alternatively, if the proximity distance between the pointing means and the sensor increases, the sensed area may increase in brightness, and conversely, if the proximity distance is reduced, the sensed area may decrease in brightness. Furthermore, the controller 180 may increase the brightness of the area according to the length of time for which the user's touch is maintained. Alternatively, the controller 180 may decrease the brightness of the area when the user releases the touch.

Thus, the mobile terminal 100 may provide a searchlight effect to the area where the touch operation is sensed, thereby allowing the user to check information displayed on specific areas of the display 151.

Additionally, the controller 180 displays information corresponding to the area where the direct touch or proximity touch is sensed. Furthermore, the controller 180 may adjust the color of the information which is not displayed in the sensed area. Specifically, the color of the information may be adjusted such that the color is replaced with a darker shade of the original color. For example, if the color of the information is light grey, the controller 180 may adjust the color to dark grey. Accordingly, as a result of the color adjustment, the display screen dims, and the sensed area becomes brighter via the luminosity contrast.

Alternatively, the controller 180 may adjust the color of the area where the direct touch or proximity touch is sensed while maintaining the color of the other information displayed on the display. For example, if the color of the information on the screen is light blue, the controller 180 may adjust the color of the information in the sensed area to a dark blue. As a result, the sensed area becomes brighter via the luminosity contrast.

The controller 180 decreases the brightness of an area where a direct touch or proximity touch was not sensed, and simultaneously, adjusts the brightness of the backlight of the display 151 according to a distance between the pointing means and the sensor, a touch time, or a holding time for maintaining a predetermined distance between the pointing means and the sensor. Therefore, the brightness level of the sensed area may be adjusted according to the distance detected by the proximity sensor and the touch time. Accordingly, when a backlight of the display 151 is turned off, the searchlight effect may illuminate the sensed area. Furthermore, when the backlight of the display 151 is turned on, a highlighting effect may distinguish the sensed area.

Moreover, the controller 180 may adjust the brightness of the area where a direct touch or proximity touch was sensed when an external key, such as a hot key, or a function key, is pressed. The controller 180 may gradually expand the radius of the sensed area according to the touch time or the proximity distance.

Hereinafter, a method for controlling the brightness of the certain area, via the controller 180, when the user's approach is sensed will be given in detail.

If the display 151 is implemented as a self-light emitting diode, the controller 180 controls the brightness of an area by controlling the power supplied to a light emitting diode of the area where the direct touch or the proximity touch is sensed. Specifically, a greater supply of power is provided to the light emitting diodes in the sensed area.

Additionally, if the display 151 is implemented as a display device including a backlight, the controller 180 controls the brightness of the display by adjusting the color of information displayed in an area where the direct touch or the proximity touch was not sensed. The color of the information is adjusted such that the information is displayed with a darker color as compared to the original color.

Figure 5:
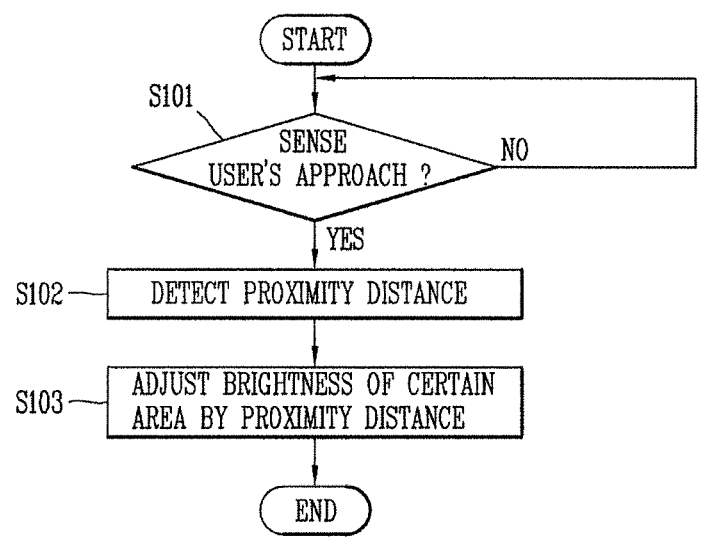
FIG. 5 illustrates a flowchart showing a screen control method of a mobile terminal according to one embodiment of the present invention.
Figure 6:
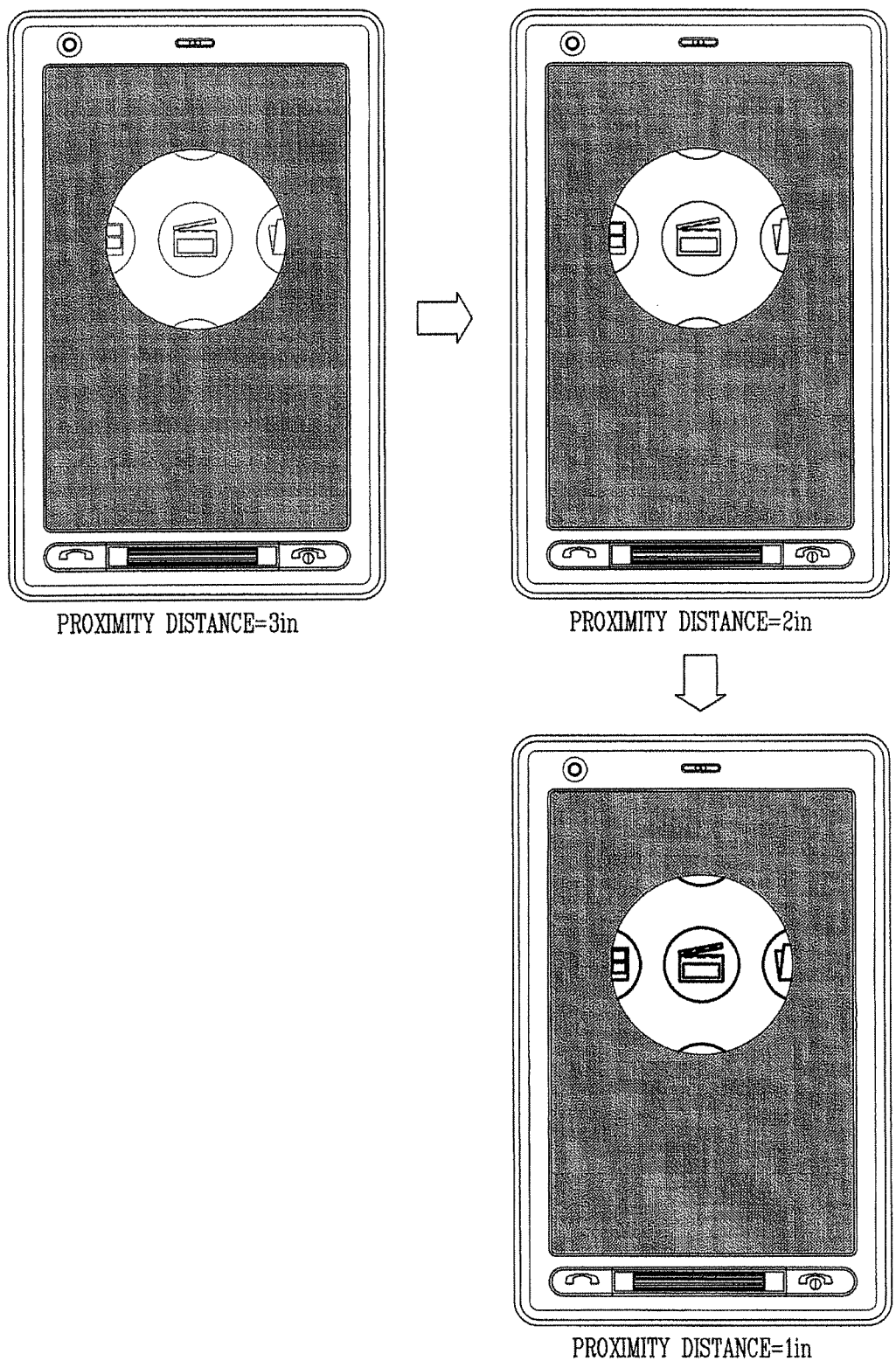
FIG. 6 illustrates an exemplary display screen of the mobile terminal of FIG. 5 according to one embodiment of the present invention.

FIG. 5 illustrates a flowchart for a screen control method of a mobile terminal according to one embodiment of the present invention. FIG. 6 illustrates an exemplary display screen of the mobile terminal in FIG. 5 according to one embodiment of the present invention.

In a standby state of the mobile terminal 100 wherein a display light may be turned off, a user may activate a searchlight function to check information, such as a received message, or a memo. The searchlight function refers to a function for illuminating an area where a user's direct touch or proximity touch is sensed. The searchlight function may be implemented via a toggle key disposed outside the mobile terminal 100 or may be set by a menu of the mobile terminal 100.

A sensor provided in the display 151 may sense the pointing means approach to the display 151 (S101). If the approach of the pointing means is sensed, the display 151 may detect a proximity distance between the pointing means and the display 151 (S102). The display 151 may detect and output location information of an area where the approach of the pointing means is sensed. If the searchlight function has been activated, the controller 180 may control the brightness of the area where the approach of the pointing means is sensed (S103) according to the proximity distance and the location information received from the display 151. A radius of the area where the brightness level is adjusted may be a preset value or a value set by a user's menu manipulation.

Additionally, the controller 180 may adjust the color of information which is not displayed in the sensed area. Specifically, the color of the information may be adjusted to display a color which is darker in comparison to the original color of the information. Accordingly, the color adjustment creates an effect of illuminating the sensed area.

Accordingly, the controller 180 may adjust the brightness of the area where the approach of the pointing means is sensed. For example, if a user uses his finger to approach the display 151 to execute a specific function, the display 151 may detect the proximity distance of the finger and may transfer the information to the controller 180. As the proximity distance decreases, the controller 180 may increase amperage to the backlight of the display 151 for illuminating the sensed area. Consequently, the brightness of the sensed area is increased as shown in FIG. 6.

The embodiment described above refers to a scenario in which the brightness of the sensed area is increased as the proximity distance of the user decreases. Conversely, the mobile terminal 100 may also be configured such that as the proximity distance of the user increases, the brightness of the sensed area decreases.

Figure 7:
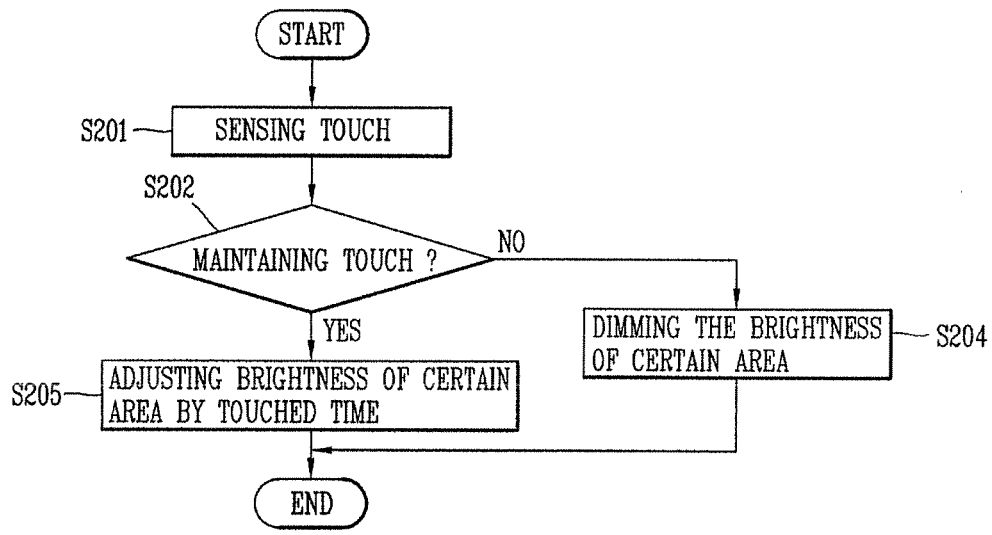
FIG. 7 illustrates a flowchart showing a screen control method of a mobile terminal according to another embodiment of the present invention.

FIG. 7 illustrates a flowchart for a screen control method of a mobile terminal according to another embodiment of the present invention.

If the user touches a certain position on the display 151 with an object, such as a finger, the display 151 may transmit location information of the touched position to the controller 180 (S201). The controller 180 may then activate a counter in response to the sensed touch.

The controller 180 determines if the touch is maintained on the display 151 (S202). If the touch is maintained, and thereby continues to be sensed, the controller 180 controls the brightness of the touched area according to the duration of the touch (S205). For example, if the touch is maintained, the controller 180 increases the brightness of the touch area by one illumination level for each period of time which has elapsed.

Additionally, if the user releases the touch, the controller 180 controls the display 151 to reduce the brightness of the area which was previously touched (S204). Alternatively, if the user releases the touch, the controller 180 may terminate the power supply to the display 151, thus terminating the illumination of the area which was previously touched.

Figure 8:
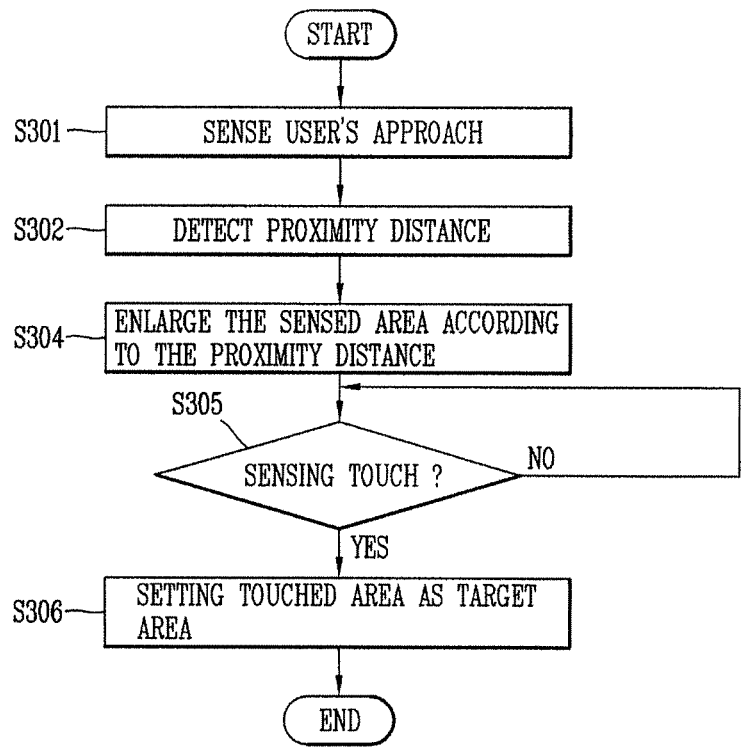
FIG. 8 illustrates a flowchart showing a screen control method of a mobile terminal according to another embodiment of the present invention.
Figure 9A:
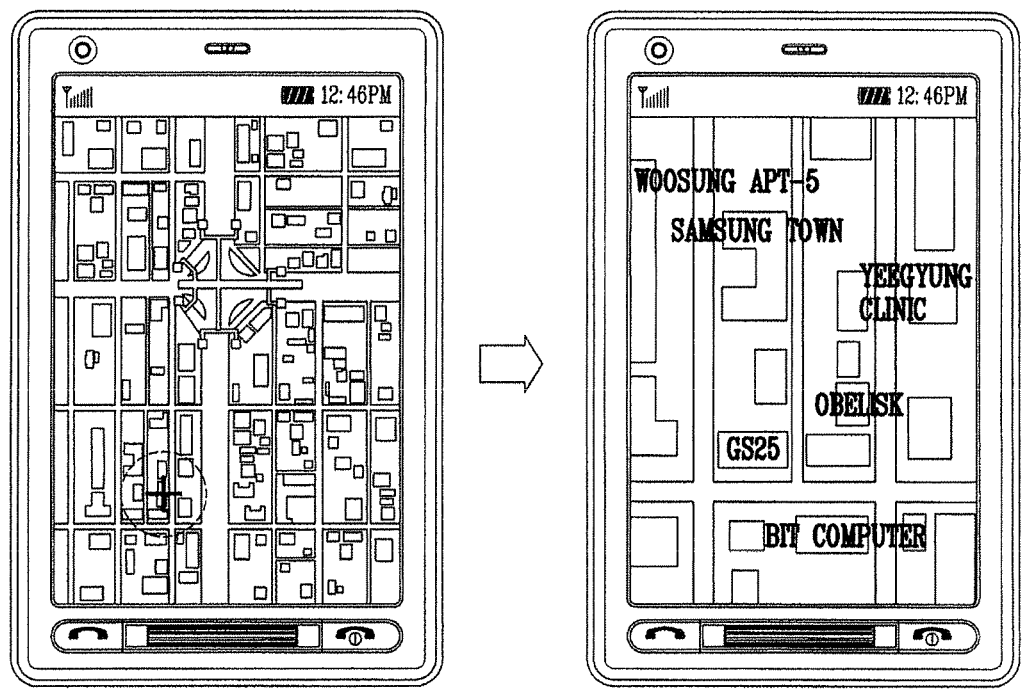
FIGS. 9A and 9B illustrate respective exemplary views of a display screen when the mobile terminal of FIG. 8 executes a navigation system according to another embodiment of the present invention.
Figure 9B:
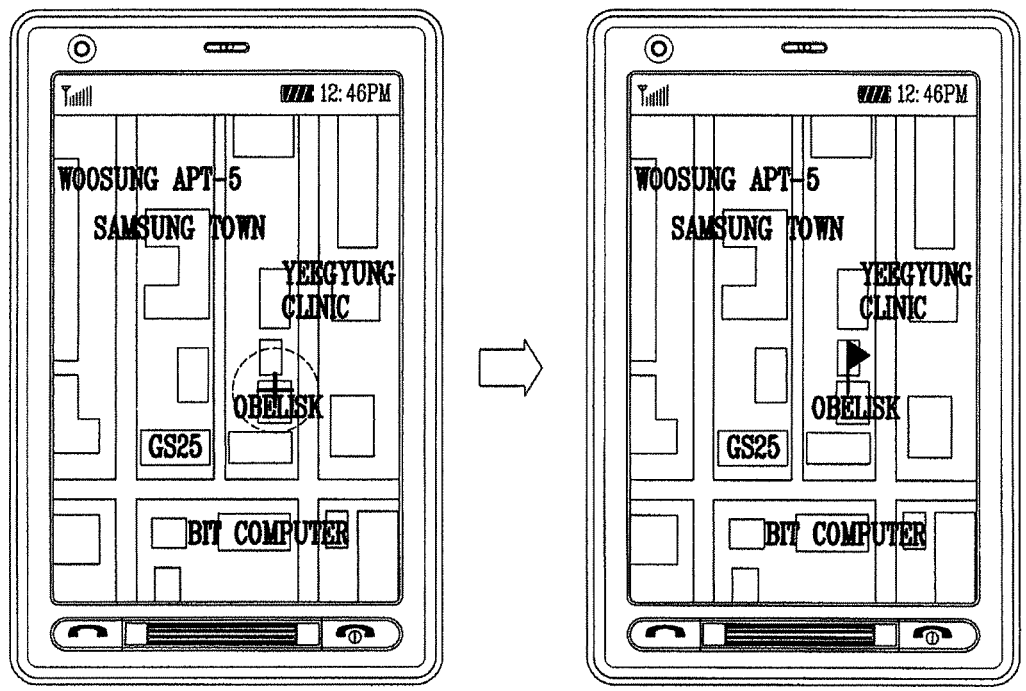
Figure 10:
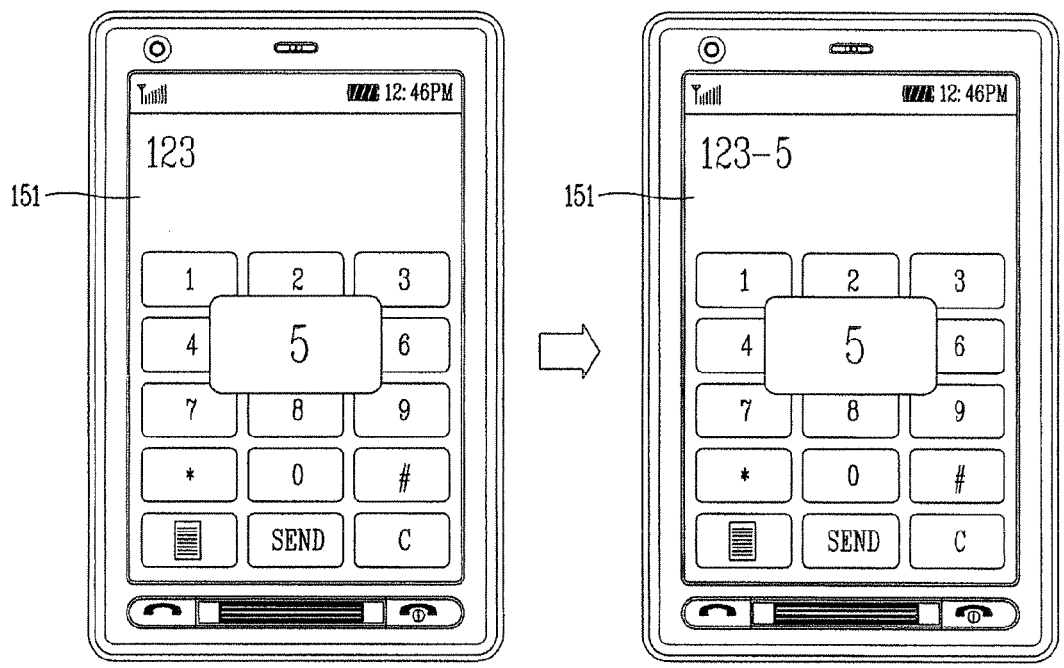
FIG. 10 illustrates an exemplary view of a display screen when the mobile terminal of FIG. 8 performs a dialing operation according to another embodiment of the present invention.

FIG. 8 illustrates a flowchart for a screen control method of a mobile terminal according to another embodiment of the present invention. FIGS. 9A and 9B are respective exemplary views of a display screen when the mobile terminal in FIG. 8 executes a navigation function. FIG. 10 is an exemplary view of a display screen when the mobile terminal in FIG. 8 performs a dialing operation.

Hereinafter, enlarging or reducing an area in response to an approach of the pointing means will be described in detail with reference to the accompanying drawings.

For example, while a navigation function is executed, if an object approaches the display 151, the display 151 may sense the approach of the object, and may detect a proximity distance of the object in addition to the location information of the sensed area. The display 151 may then transmit the proximity distance and the location information to the controller 180 (S301, S302).

According to the detected proximity distance, the controller 180 may enlarge information corresponding to the sensed area at a predetermined rate (S304), as illustrated in FIG. 9A. For example, the controller 180 of the mobile terminal 100 may enlarge the sensed area by double, triple, or quadruple, each time the distance between the user's finger and the display 151 is reduced by 0.1 cm.

When the sensed area is enlarged and a user directly touches the display 151, the display 151 may sense the direct touch input and may output location information of the touched area (S305). The controller 180 may set the area where the touch is sensed as a target area (S306). For example, as illustrated in FIG. 9B, if the touch input is generated when the sensed area is enlarged, the area, 'Obelisk', where the touch is sensed is set as a target area.

As described above, if the user's approach is sensed while the navigation system is executed, the sensed area is enlarged or reduced according to the proximity distance. Additionally, as illustrated in FIG. 10, if a user's approach is sensed when a call function is executed, a button associated with the sensed area is enlarged at a ratio according to the proximity distance.

Furthermore, if a touch is sensed while the button is enlarged, the mobile terminal 100 receives an input of information associated with the corresponding button.

For example, as illustrated in FIG. 10, when an enlarged button '5' is touched, the controller 180 displays information, the number '5', corresponding to the touched button on the display 151.

Figure 11:
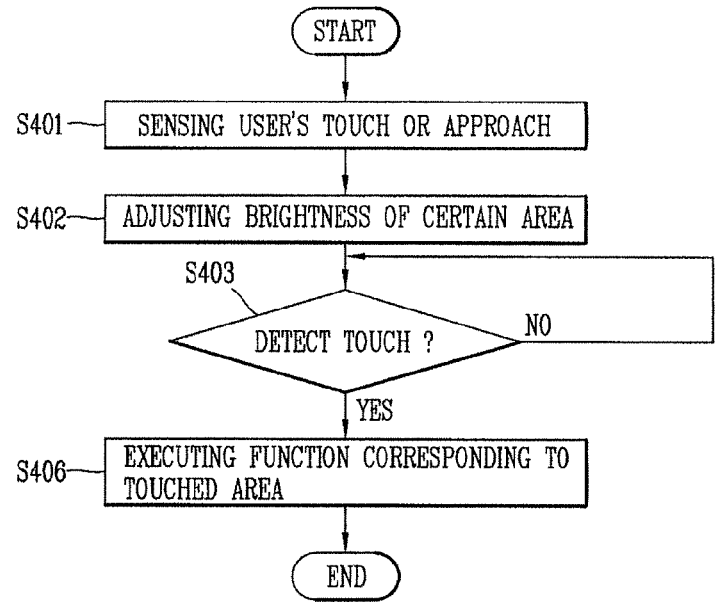
FIG. 11 illustrates a flowchart for a screen control method of a mobile terminal according to another embodiment of the present invention.
Figure 12:
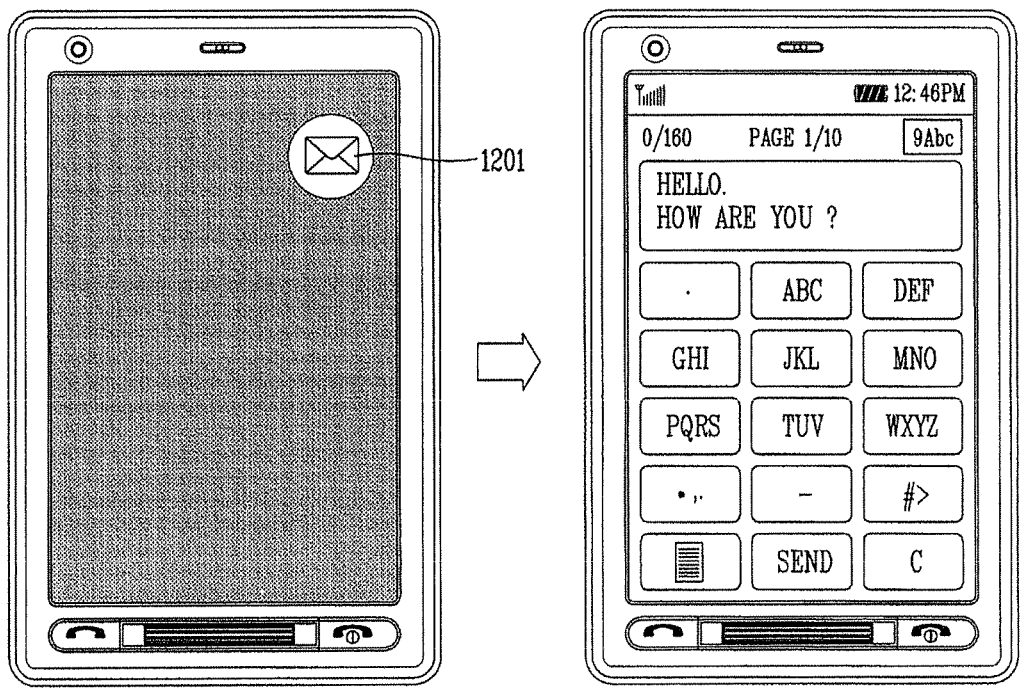
FIG. 12 illustrates an exemplary view of a display screen of the mobile terminal in FIG. 11 according to another embodiment of the present invention.

FIG. 11 illustrates a flowchart for a screen control method of a mobile terminal according to another embodiment of the present invention. FIG. 12 illustrates an exemplary view for a display screen of the mobile terminal in FIG. 11.

If the user's touch or approach is sensed, the controller 180 adjusts a brightness of a sensed area (S401, S402). Additionally, after the user's touch or approach is sensed, the controller 180 may determine if a subsequent touch is detected in the sensed area (S403).

If a touch is detected in the sensed area, the controller 180 executes a function associated with the area where the touch is detected. The function may be executed according to the location information of the touched area (S406). The location information is provided by the display 151.

For example, as illustrated in FIG. 12, when a message icon area 1201 is illuminated via a direct touch or a proximity approach, the controller 180 may execute a message function if the user touches the message icon.

The controller 180 adjusts the brightness by expanding the display area to be illuminated. The display area is expanded from the touched message icon area 1201 to the entire display screen of the display 151. Specifically, the mobile terminal 100 controls the brightness of the entire display screen of the display 151, and is not limited to controlling the brightness of only a portion of the display 151.

Figure 13:
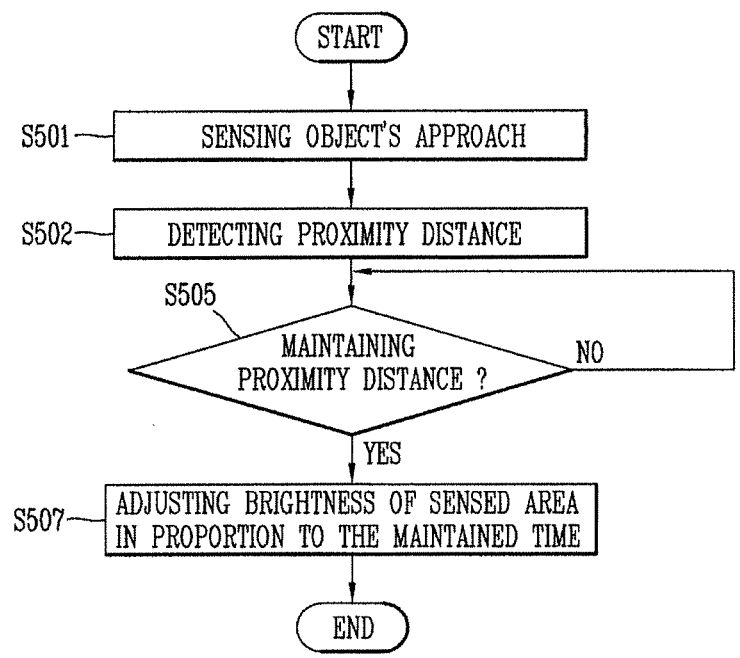
FIG. 13 illustrates a flowchart for a screen control method of a mobile terminal according to another embodiment of the present invention.

FIG. 13 illustrates a flowchart for a screen control method of a mobile terminal according to another embodiment of the present invention.

Referring to FIG. 13, if an object approaches the display 151, the display 151 may detect a proximity distance between the object and the display 151 (S501, S502). The display 151 outputs the detected distance to the controller 180. Additionally, the controller 180 operates the counter if the object's approach is sensed.

Upon receiving the proximity distance output from the display 151, the controller 180 determines if the proximity distance is maintained at a certain distance (S505).

If the controller 180 determines that the proximity distance is maintained at a certain distance, the controller 180 may gradually brighten a sensed area according to the time which the proximity distance is maintained (S507). For example, if a proximity distance is maintained at 0.3 cm, the area associated with the proximity touch may increase in brightness proportional to the length of time the proximity touch is maintained.

As described above, if an object is maintained above the display screen at a certain distance, the sensed area increases in brightness according to the time which the object is maintained. However, the present invention is not limited to the exemplary embodiment described above. Alternatively, the brightness of a sensed area may be controlled according to a distance and a period of time which the proximity distance is maintained. Specifically, the brightness may be controlled if the proximity touch is maintained beyond a predetermined time. Additionally, a function associated with the sensed area may be executed in response to the sensed proximity touch.

Figure 14:
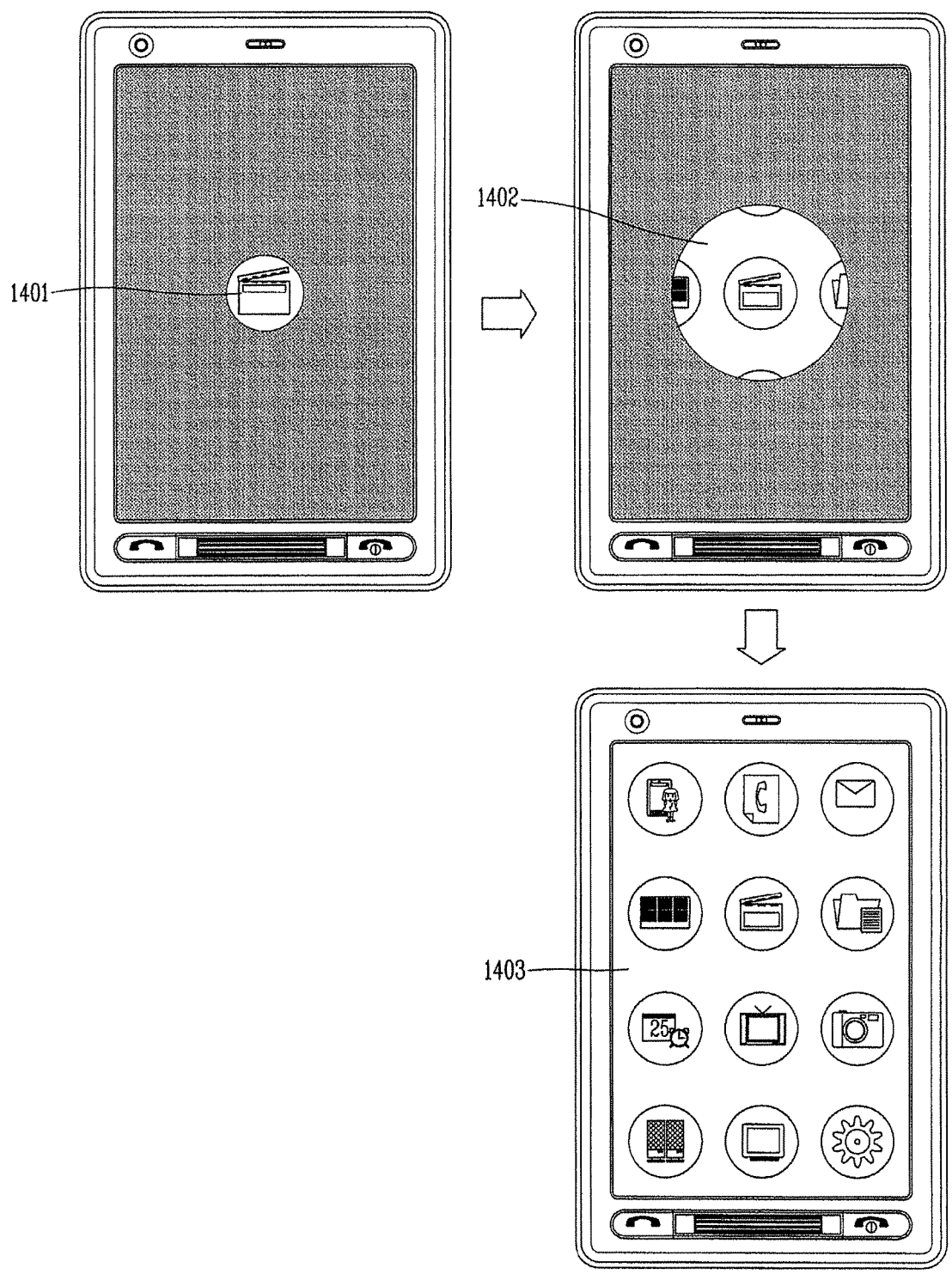
FIG. 14 illustrates an exemplary view of a display screen of the mobile terminal according to another embodiment of the present invention.

FIG. 14 illustrates an exemplary view of a display screen of the mobile terminal according to another embodiment of the present invention.

If a user manipulates an external key of the mobile terminal 100 in addition to approaching the display 151 with an object, the controller 180 may sense the approach via the display 151 and control the brightness of the sensed area. Specifically, the external key may enable and disable the searchlight function.

The controller 180 may determine if the proximity distance of the object varies. The controller 180 may adjust the size of the sensed area according to the proximity distance of the object if the proximity distance of the object changes.

For example, as illustrated in FIG. 14, the controller 180 may expand the sensed area 1401 to a greater area 1402 if the proximity distance of the object decreases. Furthermore, if a touch is detected in the sensed area 1401, 1402, the sensed area may be extended to the entire display screen 1403 of the display 151.

Figure 15:
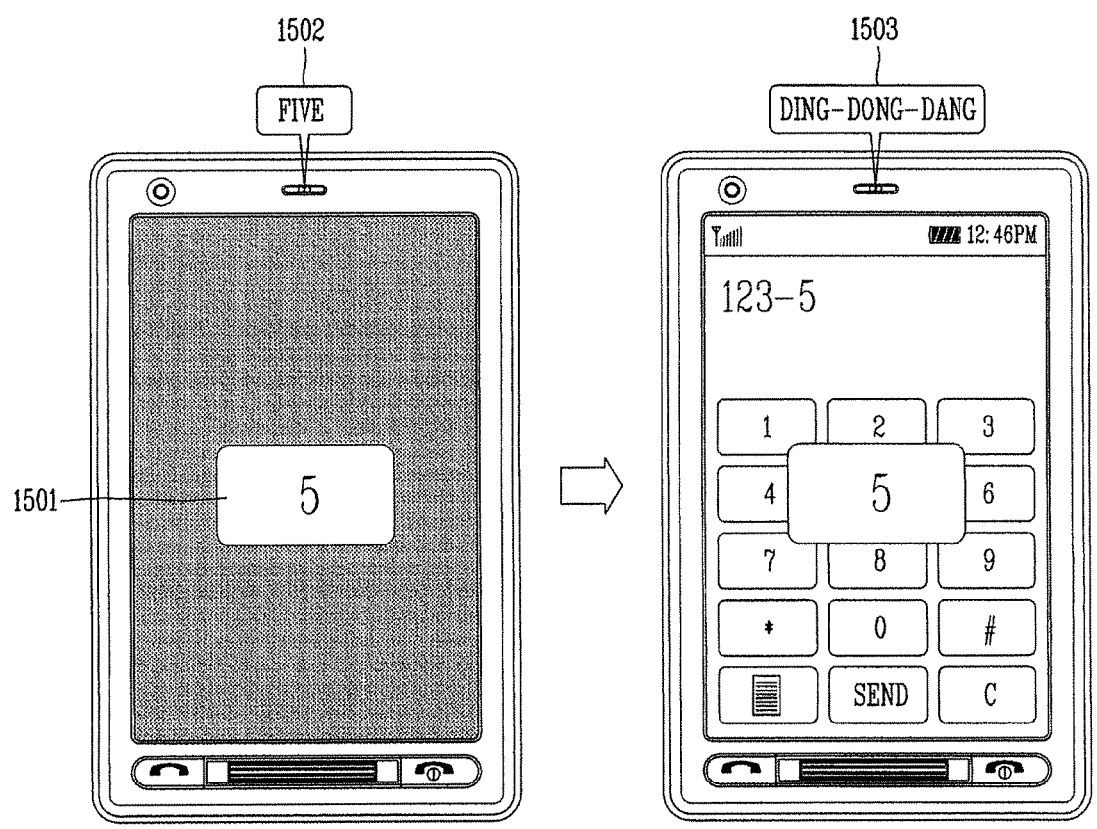
FIG. 15 illustrates an exemplary view of a display screen of the mobile terminal according to another embodiment of the present invention.

FIG. 15 illustrates an exemplary view of a display screen of the mobile terminal according to another embodiment of the present invention.

As illustrated in FIG. 15, the controller 180 controls brightness of an area of the display 151 if a user's approach is sensed. Then, if a touch is detected in the sensed area, the controller 180 may convert information displayed on the area to an audio signal and output the audio signal via the audio output module 152.

For example, the controller 180 may adjust the brightness of an area corresponding to the icon '5' if a user's approach is sensed on an area where the icon '5' is located 1501. The controller 180 may then output an audio signal 'five' 1502 corresponding to the icon '5' if a touch is sensed on the icon '5.' The user may verify the touched information via the audio signal. According to the audio output, the user may select other information without releasing the touch if the previously selected information is incorrect.

Furthermore, if the user releases the touch, the controller 180 may output a confirmation sound 1503, such as 'ding-dong-dang', via the audio output module 152, thus notifying the completion of the touch input.

Figure 16A:
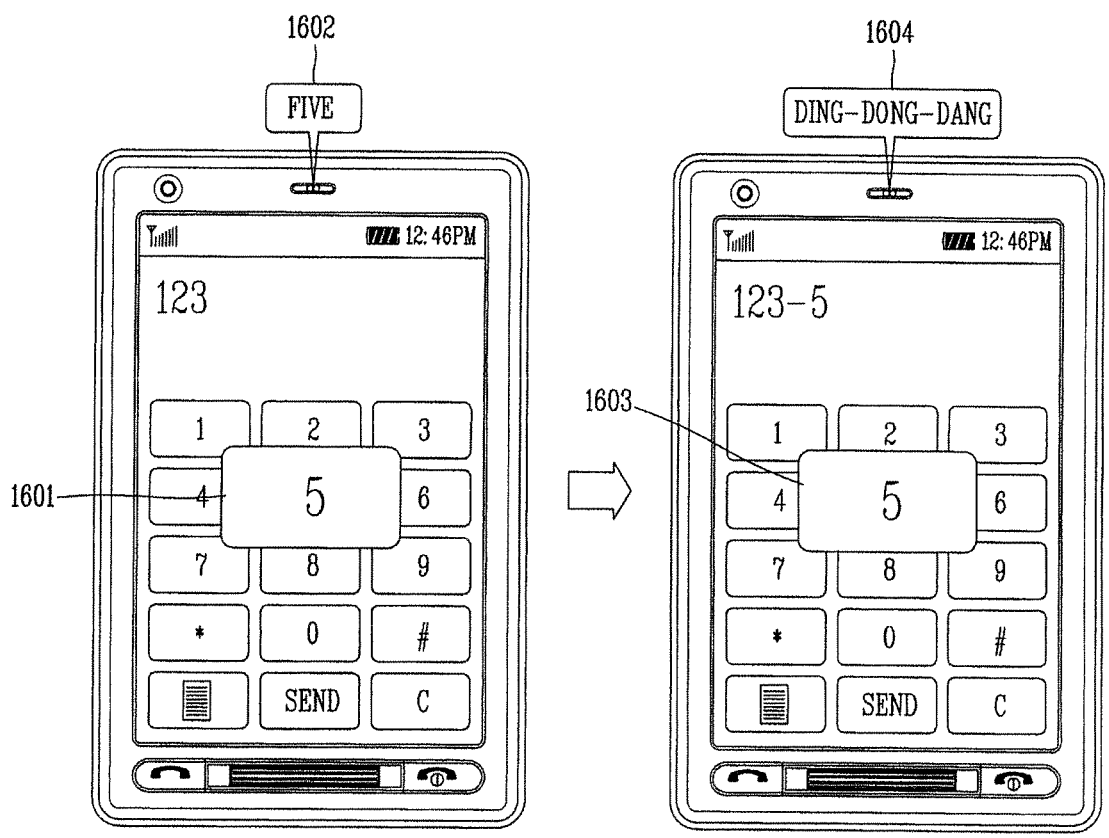
FIGS. 16A and 16B illustrate respective exemplary views of a display screen of a mobile terminal according to another embodiment of the present invention.
Figure 16B:
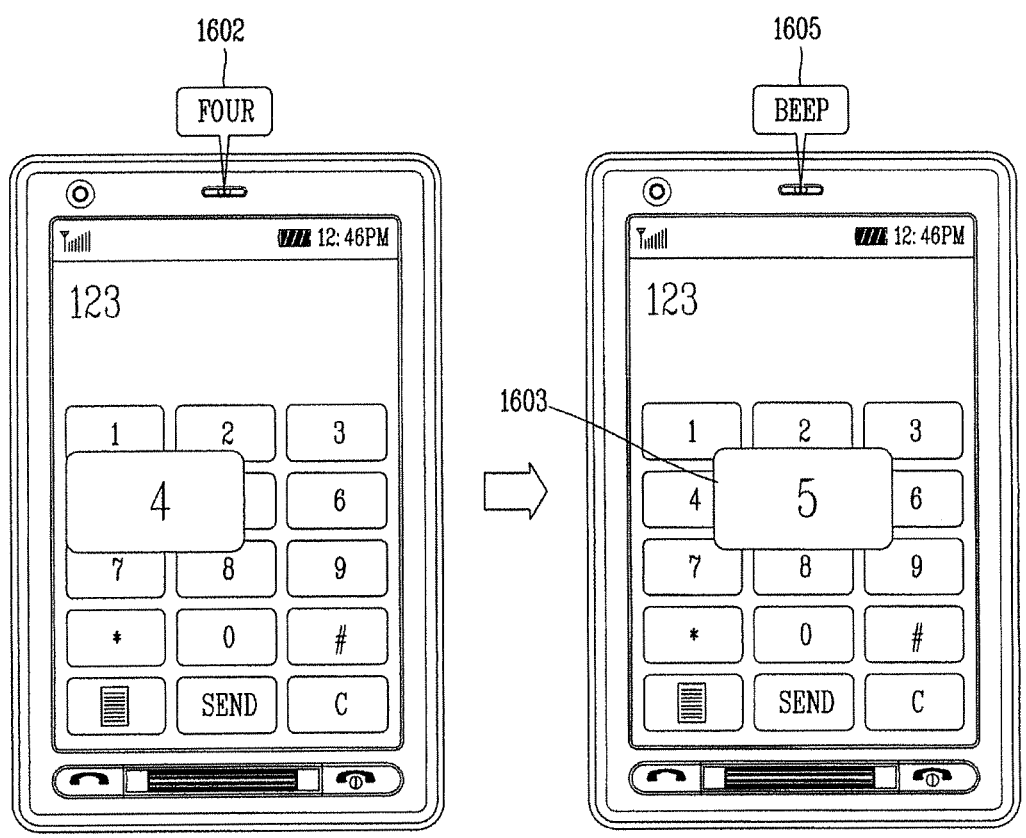

FIGS. 16A and 16B illustrate respective exemplary views of a display screen of a mobile terminal according to another embodiment of the present invention.

If a user's approach is sensed, the controller 180 converts and outputs information associated with a sensed area to an audio signal. For example, if an object approaches an icon '5' 1601, the controller 180 may sense the approach via a sensor included in the display 151 and may then convert the output '5' to an audio signal 'five' 1602. The user may determine a location of the object via the output of the audio signal. If the information is not desired or is incorrect, the user may move the object to a location of the desired information.

If the object is moved and touched at a new location. The controller 180 may detect the touch and determine if the information associated with the touch area is identical to the information previously converted to the audio signal.

According to the determined result, if a previously output audio signal 1602, 'five', is the same as the information '5' associated with a new touched area 1603, the controller 180, as illustrated in FIG. 16A, outputs the error sound 1604, such as, 'ding-dong-dang', notifying that the touch input was not accurately performed.

Conversely, if the previously output audio signal 1602, 'four', is not identical to the information '5' corresponding to the touched area 1603, the controller 180, as illustrated in FIG. 16B, outputs a confirmation sound 1605, such as 'beep', notifying the accurate input. The error sound 1604 and the confirmation sound 1605 may be simultaneously output with a vibration (not shown).

Therefore, the user may input information as desired, without looking at the display 151.

In an embodiment of the present invention, the above-described method may be implemented as software codes that can be read by a computer in a program-recorded medium. The computer-readable medium may include various types of recording devices in which data that can be read by a computer system is stored. The computer-readable medium may include a ROM, a RAM, a CD-ROM, a magnetic tape, a floppy disk, an optical data storage device, and the like. The computer-readable medium also includes implementations in the form of carrier waves, such as transmission via the Internet. In addition, the computer may include the controller 180 of the terminal.

The mobile terminal according to the present invention adjusts the brightness of a certain area if a touch or approach of the pointing means is sensed, allowing the user to selectively check information only associated with the sensed area among information displayed on the display screen.

In addition, only an area where a touch or approach of a pointing means is sensed is illuminated, thereby entirely reducing an illumination of the display screen and improving the efficiency of the power supply of the mobile terminal. Accordingly, if the user is in a dark place, such as a movie theater, the user may check information without disturbing others. Furthermore, the user may prevent the inadvertent disclosure of personal information to others.

Finally, the present invention provides a visual effect by brightening or dimming a sensed area according to a time for which a user's touch is maintained or a proximity distance, thereby providing a novel feature to the user.

The foregoing embodiments and advantages are merely exemplary and are not to be construed as limiting the present invention. The present teachings may be readily applied to other types of apparatuses. This description is intended to be illustrative, and not to limit the scope of the claims. Many alternatives, modifications, and variations will be apparent to those skilled in the art.

As the present invention may be embodied in several forms without departing from the characteristics thereof, it should also be understood that the above-described embodiments are not limited by any of the details of the foregoing description, unless otherwise specified, but rather should be construed broadly within its scope as defined in the appended claims, and therefore all changes and modifications that fall within the metes and bounds of the claims, or equivalents of such metes and bounds are therefore intended to be embraced by the appended claims.

What is claimed is:

1. A mobile terminal comprising:
a display for sensing at least a touch on the display or an approach of a pointing means proximate to a sensed area on the display; and
a controller for controlling brightness of the display at the sensed area according to the touch or the approach of the pointing means, the controller configured to:
apply an illumination only to the sensed area where the approach of the pointing means is sensed while the mobile terminal is in a standby mode in which a display light of the display is turned off, wherein a radius of the illumination is a preset value, and the illumination generates a searchlight effect;
expand the radius of the illumination in proportion to a duration of the pointing means detected at the sensed area, such that a size of the illumination generating the searchlight effect remains smaller than a size of the display; and
reduce the brightness of the display at the sensed area in response to an increase in a distance from the sensed area to the pointing means.

2. The mobile terminal of claim 1, further comprising:
a touch sensor for sensing the touch; and
a proximity sensor for sensing the approach of the pointing means.

3. The mobile terminal of claim 1, wherein the controller controls a power supply to a backlight of the display corresponding to the sensed area, wherein the backlight adjusts the brightness of the sensed area.

4. The mobile terminal of claim 1, wherein the controller replaces a first color of information displayed in an area outside of the sensed area with a darker color.

5. The mobile terminal of claim 1, wherein the controller executes a function associated with the sensed area if a predetermined distance between the pointing means and the display is maintained for a predetermined time.

6. The mobile terminal of claim 1, wherein the controller executes a function associated with the sensed area if a touch is detected after the approach of the pointing means.

7. A screen control method of a mobile terminal, the screen control method comprising:
applying an illumination only to a sensed area of a touch screen of the mobile terminal where an approach of a pointing means is sensed while the mobile terminal is in a standby mode in which a display light of the touch screen is turned off, wherein a radius of the illumination is a preset value, and the illumination generates a searchlight effect;
determining a duration during which the pointing means is held proximate to the sensed area;
expanding the radius of the sensed area illumination in proportion to the duration during which the pointing means is held, such that a size of the illumination generating the searchlight effect remains smaller than a size of the touch screen; and
reducing a brightness of the illumination in response to an increase in a distance from the sensed area to the pointing means.

8. The screen control method of claim 7, further comprising:
executing a function associated with the sensed area if a touch is detected in the sensed area of the touch screen.

9. The screen control method of claim 7, further comprising converting information associated with the sensed area to an audio signal output via an audio output unit.

10. The screen control method of claim 7, further comprising executing a function associated with the sensed area if a predetermined distance between the pointing means and the display is maintained for a predetermined time.

11. The screen control method of claim 7, wherein applying the illumination comprises controlling a power supply to a backlight of the touch screen corresponding to the sensed area to adjust the brightness of the illumination at the sensed area.

12. The screen control method of claim 7, wherein applying the illumination comprises replacing a color of information displayed in an area outside of the sensed area with a darker color.

13. The mobile terminal of claim 1, wherein the controller is further configured to expand the radius of the illumination while a position of a center of the sensed area remains fixed.

14. The screen control method of claim 7, wherein expanding the radius of the illumination comprises expanding the radius of the illumination while a position of a center of the sensed area remains fixed.

15. The screen control method of claim 7, further comprising turning on the display light if a touch is detected on the touch screen.

16. The screen control method of claim 7, wherein expanding the radius of the illumination comprises expanding the radius of the illumination and a radius of the sensed area at a same rate.

17. The screen control method of claim 7, wherein expanding the radius of the illumination is performed incrementally.

18. The mobile terminal of claim 1, wherein the controller is further configured to expand the radius of the illumination and a radius of the sensed area at a same rate.

19. The mobile terminal of claim 1, wherein the controller is further configured to expand the radius of the illumination and the radius of the sensed area incrementally.

* * * * *